(12) United States Patent
Chung

(10) Patent No.: US 7,144,768 B2
(45) Date of Patent: Dec. 5, 2006

(54) FABRICATION OF TITANIUM AND TITANIUM ALLOY ANODE FOR DIELECTRIC AND INSULATED FILMS

(76) Inventor: Juyong Chung, 1806 S. Belvoir Blvd., South Euclid, OH (US) 44121

( * ) Notice: Subject to any disclaimer, the term of this patent is extended or adjusted under 35 U.S.C. 154(b) by 0 days.

(21) Appl. No.: 10/865,654

(22) Filed: Jun. 10, 2004

(65) Prior Publication Data

US 2004/0251140 A1    Dec. 16, 2004

Related U.S. Application Data

(60) Provisional application No. 60/477,869, filed on Jun. 12, 2003.

(51) Int. Cl.
*H01L 21/8242*    (2006.01)
(52) U.S. Cl. ...................... 438/239; 438/381
(58) Field of Classification Search ............... 438/239, 438/240, 381, 758; 204/626; 29/25.03
See application file for complete search history.

(56) References Cited

U.S. PATENT DOCUMENTS

| 3,849,124 | A | * | 11/1974 | Villani .................. 420/422 |
| 5,185,075 | A | | 2/1993 | Rosenberg et al. |
| 5,211,832 | A | | 5/1993 | Cooper et al. |
| 6,544,301 | B1 | * | 4/2003 | Kobatake et al. ........ 29/25.03 |
| 6,699,431 | B1 | * | 3/2004 | Clasen et al. ................ 419/5 |
| 2003/0010407 | A1 | | 1/2003 | Arai |
| 2004/0085707 | A1 | | 5/2004 | Yano et al. |

FOREIGN PATENT DOCUMENTS

GB    2168383 A    6/1986

* cited by examiner

*Primary Examiner*—Hsien-Ming Lee
(74) *Attorney, Agent, or Firm*—Renner, Otto, Boisselle and Sklar, LLP

(57) ABSTRACT

A method for constructing a titanium film capacitor. The method includes fabricating an anode from at least one of titanium and a titanium alloy and forming a homogeneous anode film on at least one surface of the anode.

33 Claims, 12 Drawing Sheets

A sample container with inlet and outlet of gas and a vacuum system.

Fig. 1. A sample container with inlet and outlet of gas and a vacuum system.

Fig. 2. One sample container including anode and one protection container.

Fig. 3. Local heat treatment of only anode and local treatment of a sample container.

FABRICATION OF TITANIUM AND TITANIUM ALLOY ANODE FOR DIELECTRIC AND INSULATED FILMS

CROSS REFERENCE TO RELATED APPLICATION

This application is a continuation of U.S. Provisional Patent Application Ser. No. 60/477,869, filed Jun. 12, 2003, which is also fully incorporated herein by reference.

BACKGROUND OF THE INVENTION

The present invention relates generally to capacitors and more particularly to systems and methods for the fabrication of titanium and titanium alloy anodes for dielectric and insulated films.

Titanium and titanium alloy anodes have an advantage in energy density (J/g), cost ($/g) and material density (g/cm$^3$) when compared with tantalum and niobium anodes. Further, titanium is capable of providing a higher capacitance·voltage per gram (CV/g), for example, the gain is up to 10 times that of tantalum. Thus, a capacitor fabricated with a titanium or titanium alloy anode is physically smaller or, alternatively, a like sized component, possesses a higher capacitance rating than that fabricated with tantalum. When titanium or a titanium alloy is used instead of tantalum in capacitor fabrication in a capacitor having similar performance specifications, material costs are also greatly reduced, by as much as 100 times.

While titanium fabrication is advantageous, physical characteristics of the metal have heretofore prevented widespread adaptation. The structure, crystallization kinetics, and composition, as well as the electrical and electrochemical behavior, of an anode film on titanium or a titanium alloy are somewhat contradictory and inconsistent in nature. Moreover, these phenomena are mutually and multifariously related during anodizing. Further, the insulating and dielectric behavior of the anode film, e.g., leakage current and capacitance, are uncertain and inconsistent irrespective of the electrochemical parameters, including voltage, current, chemistry, concentration of electrolyte, heat treatment, and the like. As a result, titanium and titanium alloys have generally been disqualified from use in capacitors, save in possible exceptions metal for certain metal capacitors.

Thus, there exists a need resolve the inconsistent capacitance and the high and variable leakage current behaviors associated with the use of titanium and titanium alloys for anodes. Furthermore, there exists a need for controlling leakage current and capacitance in the processing or manufacture of capacitors using titanium and titanium alloy anodes. Also, in order to use titanium or a titanium alloy as a capacitor anode, the origin of the inconsistency and variation in the electrical behavior of the anode film must be understood. Moreover, the critical factors in processing or manufacture should be clearly defined. Thus, there exists a need for a new fabrication technique for anodes using titanium or a titanium alloy. Low equivalent series resistance (ESR) and high heat dissipation are also generally desired.

SUMMARY OF THE INVENTION

The present invention teaches a system for constructing a titanium film capacitor, including a capacitor constructed therefrom. The method includes fabricating an anode from at least one of titanium and a titanium alloy and forming a homogeneous anode film on at least one surface of the anode.

The system teaches further shot peening the anode to heavily deform a surface of anode. Such deformation of the anode enhances migration of titanium ions at the interface between the anode and the anode film.

The system also teaches quenching the anode so that the anode has an amorphous structure. The amorphous nature of the anode supplies a higher density of active sites at which to nucleate titanium oxide relative to a crystalline structure.

The system also teaches depositing an anode film using calcium, calcium oxide, manganese, manganese oxide, magnesium, magnesium oxide or a combination thereof.

The method further teaches etching the anode to roughen the surface of the anode. Such a surface roughness preferably has a height from approximately 1 nanometer (nm) to approximately 0.1 millimeter (mm) and a width from approximately 1 nm to approximately 0.1 mm.

The system also teaches the use of sputtering to form the anode film on the anode. Such sputtering is preferably performed using an argon gas.

The system also teaches forming the anode film through treating the anode with one of hydrogen (H), the alkali group of metals (Li, Na, K, Rb, Cs, and Fr), the halogen group of elements (F, Cl, Br, I, and At), or combination thereof.

The system also teaches treating the anode such that the film is a solid solution layer. Such a layer includes oxygen, carbon, nitrogen, hydrogen, or a combination thereof.

The system additionally teaches an anode film containing a titanium suboxide, a titanium subcarbide, a titanium subnitride, a titanium subhydride, or a combination thereof. Such a layer may be as much as 10 centimeters in thickness.

The method further teaches forming the anode film by anodizing the anode.

These and other objects and advantages of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the spirit of the present invention. Accordingly, the drawing and descriptions will be regarded as illustrative in nature and not as restrictive.

BRIEF DESCRIPTION OF THE DRAWINGS

The accompanying drawings, which are incorporated in and constitute a part of this specification, illustrate embodiments of the present invention and, together with a general description of the invention given above, and the detailed description given below, serve to explain the principles of the present invention.

DETAILED DESCRIPTION OF THE DRAWINGS

The present invention relates generally to the fabrication of structures to form anodes using titanium or a titanium alloy. Titanium or titanium alloy anodes advantageously include at least one of titanium oxide, titanium suboxide, titanium nitride, titanium subnitride, titanium carbide, titanium subcarbide, titanium hydride, titanium subhydride, titanium solid solution of carbon, titanium solid solution of hydrogen, titanium solid solution of nitrogen, titanium solid solution of oxygen, and inorganic materials containing titanium in the form of bulk, thin film, precipitates and a combination thereof. Moreover, the anode materials advantageously include an amorphous or crystalline structure, or combination thereof. Titanium or titanium alloy anodes are in any suitable form, including, but not limited to, a sheet, a wire, an individual powder, a powder aggregate, and a thin film. Such anodes are formed by sputtering, electrochemical reaction, ion-implantation, chemical reaction, heat treatment, sintering, oxidation, reduction, carburization, decarburization, nitriding, denitriding, hydrogenization, dehydrogenization, chemical vapor deposition, physical vapor deposition, evaporation, or combination of the foregoing. Thus, an anode in accordance with principles of the present invention is advantageously made of titanium, a titanium alloy, or combination thereof and is suitably used with dielectric and insulated films in capacitors, for example.

Further, a titanium or titanium alloy anode in accordance with principles of the present invention is advantageously heavily deformed on a surface with a thickness of up to 1 millimeter (mm) and/or in bulk with a defect density of $10^7$ to $10^{30}$/centimeter$^2$ (cm$^2$). The objective of such a surface and/or bulk modification is to enhance migration of titanium ions at the interface between an anode film and a titanium or a titanium alloy. This promotes stoichiometric anodic oxide growth by well-balanced titanium ionic transport. Such a titanium or titanium alloy anode is advantageously formed by compression, tension, shot peening, noble gas (e.g., He, Ne, Ar, Kr, Xe and Rn) bombard and impingement, or any mechanical polishing and buffing using rubbing and scratching.

Figure 1:
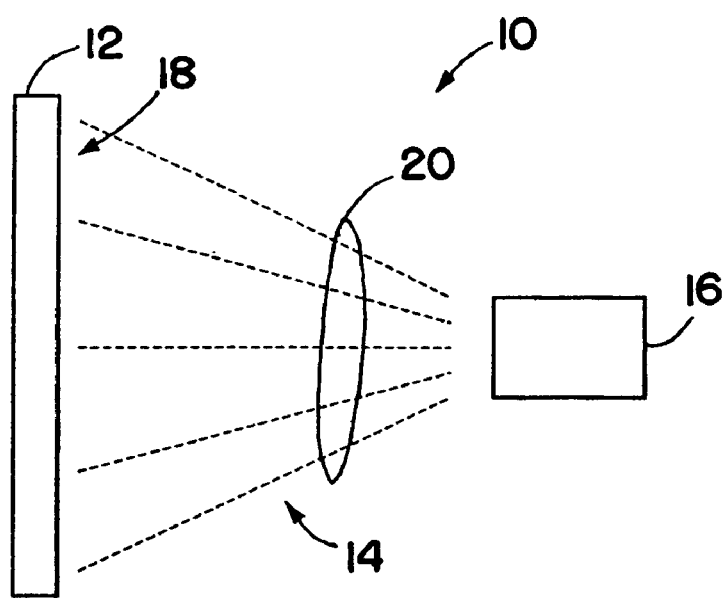
FIG. 1 is a diagram illustrating a process of shot peening to heavily deform titanium or a titanium alloy anode in accordance with principles of the present invention.

Referring to FIG. 1, a diagram illustrating an exemplary process 10 of shot peening to heavily deform a surface of a titanium or titanium alloy anode is shown. Process 10 begins by cleaning a sample 12 of titanium or a titanium alloy with acetone in an ultrasonic cleaner for approximately thirty (30) minutes and with a mild acid, such as, for example, a 10% $HNO_3$ solution. Once sample 12 is clean, it is loaded in shot peening system 14. Shot peening system 14 comprises a compression gun 16. In use, compression gun 16 propels hard material balls, such as a ceramic or sand, against a surface 18 of sample 12, as generally indicated at reference numeral 20. Such propelling of a ceramic or sand against surface 18 of sample 12 "shot peens" surface 18, deforming the titanium or titanium alloy heavily. Such a deformation enhances the migration of titanium ions at the interface between surface 18 and an anode film (not shown).

A titanium or titanium alloy anode also advantageously has an amorphous, a random and/or a distorted structure, or a combination thereof, and will supply a higher density of active sites at which to nucleate titanium oxide because of its comparatively unstable nature relative to a crystalline structure. The kinetics of amorphous titanium anodization are also enhanced relative to a crystalline structure. Such a titanium or titanium alloy anode is suitably made by quenching fully or partially molten titanium or titanium alloy to any temperature by any cooling rate.

Figure 2:
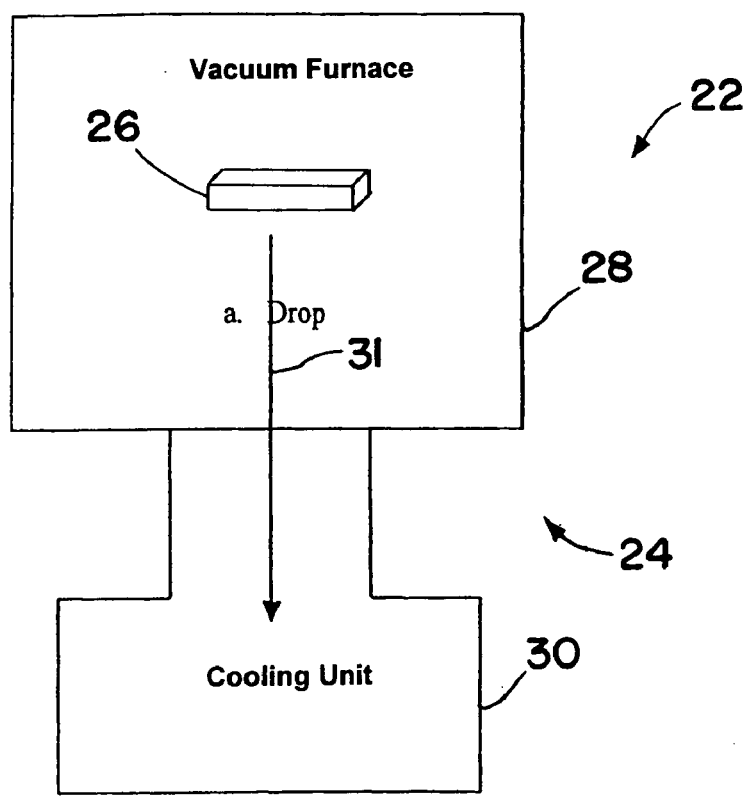
FIG. 2 is a diagram illustrating a method of quenching a titanium or titanium alloy anode in accordance with teachings of the present invention.

Referring now to FIG. 2, a diagram illustrating an exemplary process 22 of quenching a titanium or titanium alloy anode in accordance with principles of the present invention is shown. Process 22 begins by cleaning sample 26 of titanium or titanium alloy with acetone in an ultrasonic cleaner for approximately 30 minutes and with mild acid, such as a 10% $HNO_3$ solution. Once sample 26 is clean, sample 26 is placed in vacuum furnace 28 of quenching system 24 and heated to a temperature between approximately 1200 degrees Celsius (° C.) and approximately 2000° C. in a vacuum between approximately $10^{-6}$ and approximately $10^{-11}$ Torr. Sample 26 is then quenched, such as by dropping sample 26 into cooling unit 30 of quenching system 24, as indicated by arrow 31. Cooling unit 30 advantageously uses liquid nitrogen, dry ice or ice for cooling sample 26. Such a process 22 facilitates the production of a titanium or titanium alloy anode, e.g., sample 26, with an amorphous structure that supplies a higher density of active sites at which to nucleate titanium oxide relative to a crystalline structure.

It will be appreciated that, in the alternative, a titanium or titanium alloy anode having an amorphous structure is also suitably attained by physical vapor deposition (PVD), chemical vapor deposition (CVD), electroplating, an electrochemical process, sputtering, thermal evaporation, electron-beam deposition, or laser-pulse deposition, and their modification processes. Further, the substrate for such a titanium or titanium alloy anode may include any other material as well. The substrate temperature is suitably controlled between approximately −273° C. and approximately 300° C.

A titanium or titanium alloy anode is also suitably deposited fully or partially by calcium, calcium oxide, manganese, manganese oxide, magnesium, magnesium oxide, or a combination thereof. Calcium, calcium oxide, magnesium and magnesium oxide readily dissolve in distilled water or a mild acid such that the resulting structure, e.g., anode, is not compromised by their presence. Further, deposition will prevent the incorporation of anion impurities, such as $PO_4^{3-}$ and $SO_4^{2-}$, etc., and thereby control the migration of oxygen ions in the early stages of anodization. If manganese is present during the anodizing process, manganese dioxide is formed preferentially to titanium dioxide. The resulting interfacial stresses help the migration of titanium ions through the oxide, enhancing the kinetics of oxide formation. Manganese controls the concentration of oxygen ions during anodization, thereby regulating the amount of oxygen migrating through the oxide layer. Manganese also forms manganese dioxide, the benefits of which are a simultaneous formation of an anodic film and a solid electrolyte of $MnO_2$. In a deposition of manganese dioxide (hexagonal system), oxygen is easily diffused in a direction parallel to a close packed plane. This material is advantageously used to moderate or enhance oxygen migration during anodization. Additionally, and as previously mentioned, the interfacial stresses help the migration of titanium ions and promote oxide formation. A beneficial effect of manganese dioxide is realized in the development of a thin solid electrolyte.

The deposition of the foregoing materials on an anode are advantageously performed by physical vapor deposition (PVD), chemical vapor deposition (CVD), electroplating, electrochemical process, sputtering, thermal evaporation, electron-beam deposition, or laser-pulse deposition, and their modification process.

Figure 3:
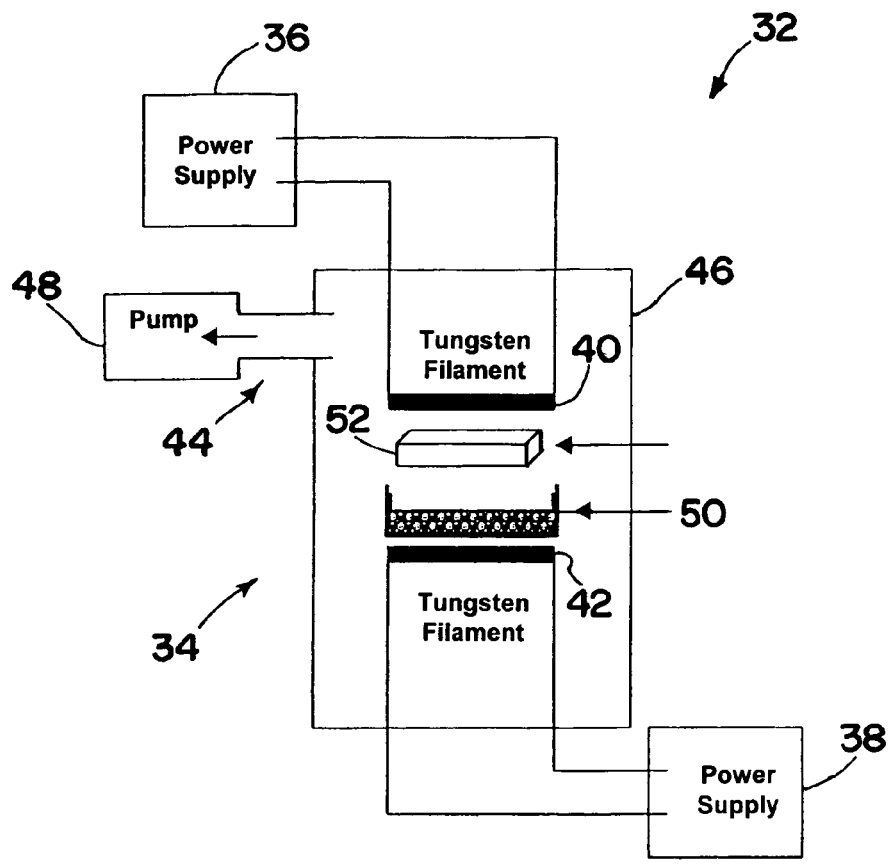
FIG. 3 is a diagram illustrating a deposition process to form a titanium or titanium alloy anode using calcium or magnesium, and performed in a vacuum using a thermal evaporation system.

Referring now to FIG. 3, a diagram illustrating an exemplary deposition process 32 using calcium or magnesium, and performed in a vacuum using a thermal evaporation system 34 is shown. Thermal evaporation system 34 generally comprises two power supplies 36, 38 and two tungsten filaments 40, 42, respectively electrically coupled thereto. Thermal evaporation system 34 further includes a vacuum system 44. Vacuum system 44 comprises a vacuum chamber 46 and a pump 48 coupled to the vacuum chamber 46, and used to evacuate the vacuum chamber 46. Tungsten filaments 40, 42 are located inside vacuum chamber 46.

Vacuum chamber 46 suitably houses an evaporating material 50, e.g., calcium or magnesium, and a sample 52 of titanium or titanium alloy. Power supplies 36, 38 are used to energize tungsten filaments 40, 42 that, in turn, heat sample 52 and evaporating material 50, respectively.

Deposition process 32 begins by cleaning sample 52 with acetone in an ultrasonic cleaner for approximately 30 minutes and with mild acid, such as a 10% $HNO_3$ solution. Sample 52 and evaporating material 50 are then placed in vacuum chamber 46 and pump 48 is energized to lower the vacuum in vacuum chamber 46 down to between approximately $10^{-6}$ and approximately $10^{-11}$ Torr. Simultaneously, tungsten filaments 40, 42 are energized using power supplies 36, 38, respectively, and sample 52 and evaporating material 50 are heated to a temperature between approximately 500° C. and approximately 1000° C. Thus, deposition process 32 forms a titanium or titanium alloy anode, such as illustrated by sample 52.

A titanium or titanium alloy anode also advantageously has a surface roughness with a height from approximately 1 nanometer (nm) to approximately 0.1 millimeter (mm), and a width from approximately 1 nm to approximately 0.1 mm, in any suitable shape. Such a surface roughness advantageously increases the surface area and surface energy, promotes the nucleation of anodic titanium oxide, and forms layered growth, as opposed to island growth. Such a titanium or titanium alloy anode is realized through mechanical polishing, wet chemical etching, or dry etching using a gas containing the halogen group of elements (e.g., F, Cl, Br, I and At) and/or a mixture of oxygen and nitrogen. Etching and polishing are also advantageously tailored to result in the preferred exposure of close packed planes, which also has the aforementioned effects in terms of forming titanium oxide.

Figure 4:
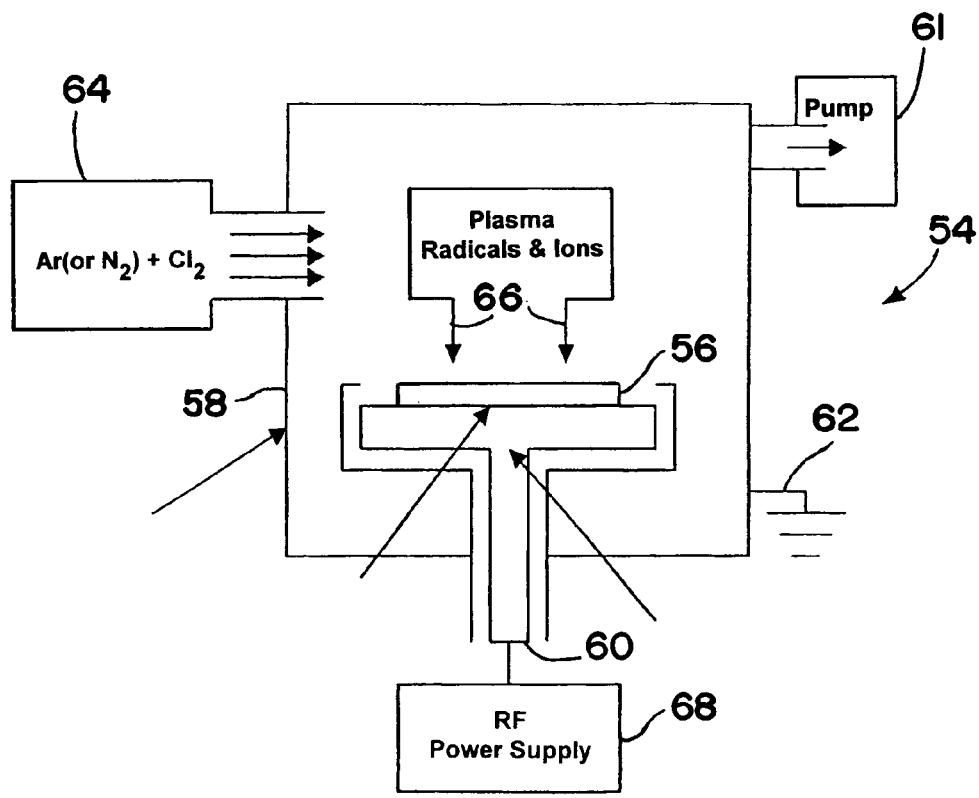
FIG. 4 is a diagram illustrating a plasma-based dry etching process to form a titanium or titanium alloy anode.

Referring to FIG. 4, a diagram illustrating an exemplary plasma-based dry etching process 54 is shown. Process 54 begins by clean a sample 56 of titanium or titanium alloy with acetone in an ultrasonic cleaner for approximately 30 minutes and with mild acid, such as a 10% $HNO_3$ solution and placing sample 56 onto a cathode 60 in etching chamber 58. Etching chamber 56 is then evacuated down to approximately $10^{-6}$ Torr using a pump 61 coupled thereto.

Next a radio frequency (RF) voltage is applied across cathode 60 and an anode or, in this example, chamber 58 using RF power supply 68. It will be appreciated that chamber 58 is also advantageously grounded as shown at reference numeral 62 to prevent electric shock. A gas 64 containing argon (Ar) or nitrogen ($N_2$) and chlorine ($Cl_2$) is then introduced into chamber 58 and plasma radicals and ions impinge on sample 56, as indicated by arrows 66, etching the sample. Such an etching process 54 produces a titanium or titanium alloy anode, e.g., sample 56, having a surface roughness with a height from approximately 1 nanometer (nm) to approximately 0.1 millimeter (mm), and a width from approximately 1 nm to approximately 0.1 mm in any shape.

A titanium or titanium alloy anode also advantageously has a surface parallel to a close packed plane, a surface up to 40 degrees off a close packed plane, and/or combination thereof. Such a titanium or titanium alloy anode is made by physical vapor deposition (PVD), chemical vapor deposition (CVD), electroplating, electrochemical process, sputtering, thermal evaporation, electron-beam deposition, or laser-pulse deposition, and their modification process. Further, the anode comprises a substrate having an amorphous and/or a crystalline structure, and may also include other materials as well. The substrate is preferably produced at a temperature ranging between approximately -273° C. and 300° C.

Figure 5:
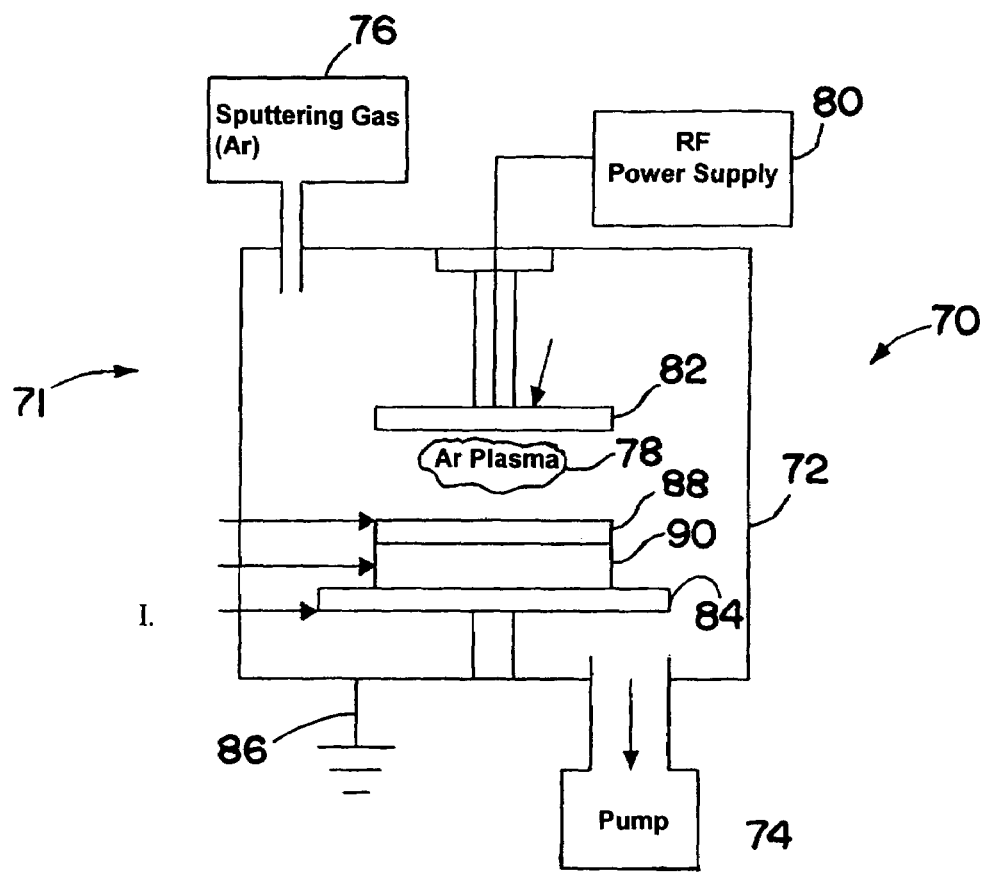
FIG. 5 is a diagram illustrating a sputtering process for depositing titanium to form a titanium or titanium alloy anode.

Referring to FIG. 5, an exemplary sputtering process 70 for depositing titanium is shown. Sputtering system 71 comprises a chamber 72 that is evacuated by a pump 74. A sputtering gas, such as argon (Ar), 76 is introduced into chamber 72 to facilitate argon plasma 78. Sputtering system 71 further comprises an RF power supply 80 electrically coupled to a titanium sputtering target 82 and a substrate holder 84, both of which are housed in chamber 72, through ground 86.

In use, a substrate 90 and titanium 88 is placed on substrate holder 84. Thus, sputtering of titanium is achieved in argon (Ar) plasma 78. Argon ions with an energy of approximately 1 to 3 KeV bombard titanium sputtering target 82 and physically dislodge titanium, thereby depositing titanium 88 on substrate 90. Thus, a titanium or titanium alloy anode having a surface parallel to a close packed plane, a surface up to 40 degrees off a close packed plane, and/or combination thereof is produced.

A titanium or titanium alloy anode is also suitably treated and modified by a solid, a liquid, and/or a vapor of hydrogen (H), the alkali group of metals (e.g., Li, Na, K, Rb, Cs, and Fr), the halogen group of elements (F, Cl, Br, I, and At), the IVb group of metals (Ti, Zr, Hf and Rf), carbon, nitrogen, oxygen, hydrogen, iron, sulfur, aluminum, silicon, copper, titanium, niobium, tantalum, yttrium, or a combination thereof in the state of an individual element, a solid solution, a complex and/or an alloy. Such a titanium or titanium alloy anode is preferably produced at any temperature below approximately 1,700° C.

Figure 6:
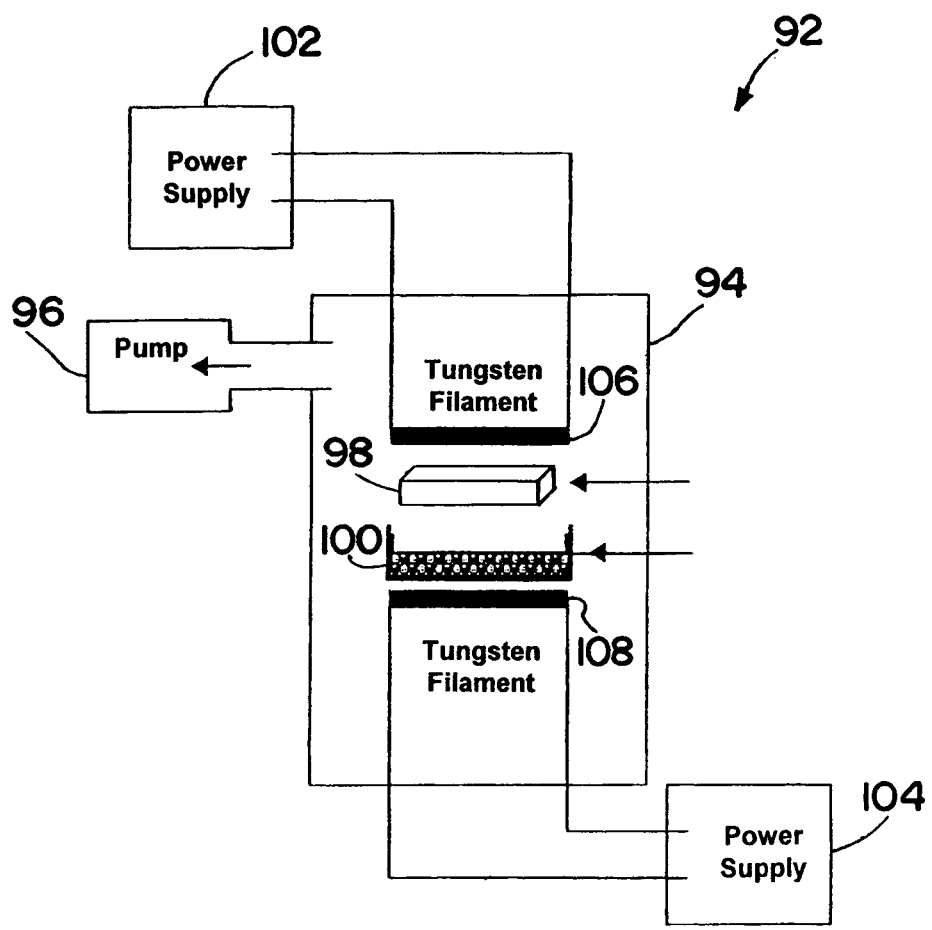
FIG. 6 is a diagram illustrating a treatment process for a titanium or titanium alloy anode using hydrogen (H), the alkali group of metals (e.g., Li, Na, K, Rb, Cs, and Fr), the halogen group of elements (F, Cl, Br, I, and At), or a combination thereof.

Referring to FIG. 6, a diagram illustrating an exemplary treatment process 92 using hydrogen (H), the alkali group of metals (e.g., Li, Na, K, Rb, Cs, and Fr), the halogen group of elements (F, Cl, Br, I, and At), or a combination thereof is shown. Process 92 is conducted in a vacuum chamber 94 into which a sample 98 of titanium or titanium alloy and evaporating material 100 using hydrogen (H), the alkali group of metals (e.g., Li, Na, K, Rb, Cs, and Fr), the halogen group of elements (F, Cl, Br, I, and At), or a combination thereof are placed.

Vacuum chamber 94 is suitably evacuated by a pump 96 to a pressure between approximately $10^{-6}$ and approximately $10^{-11}$ Torr. Power supplies 102, 104 energize tungsten filaments 106, 108, respectively electrically coupled thereto. Tungsten filaments 106, 108, are located proximate sample 98 and evaporating material 100, respectively, in vacuum chamber 94. Tungsten filaments 106, 108 thereby simultaneously heat sample 98 and evaporating material 100 to a temperature between approximately 500° C. and approximately 1700° C. Thus, a titanium or titanium alloy anode, e.g., sample 98, is treated and modified by hydrogen (H), the alkali group of metals (e.g., Li, Na, K, Rb, Cs, and Fr), the halogen group of elements (F, Cl, Br, I, and At), or a combination thereof.

A titanium or titanium alloy anode also advantageously has a solid solution layer including oxygen, carbon, nitrogen, hydrogen, or a combination thereof. The solubility of oxygen, carbon, nitrogen and hydrogen is 50, 10, 40, and 75 atomic percent, respectively. The thickness of the solid solution layer is suitably as much as 10 centimeters (cm). Such a titanium or titanium alloy anode is produced at any temperature below approximately 1,700° C. and in any environment including oxygen, carbon, nitrogen, hydrogen, or a combination thereof. The pressure of the oxygen, carbon, nitrogen, hydrogen, or a combination thereof is preferably below 760 Torr.

Figure 7:
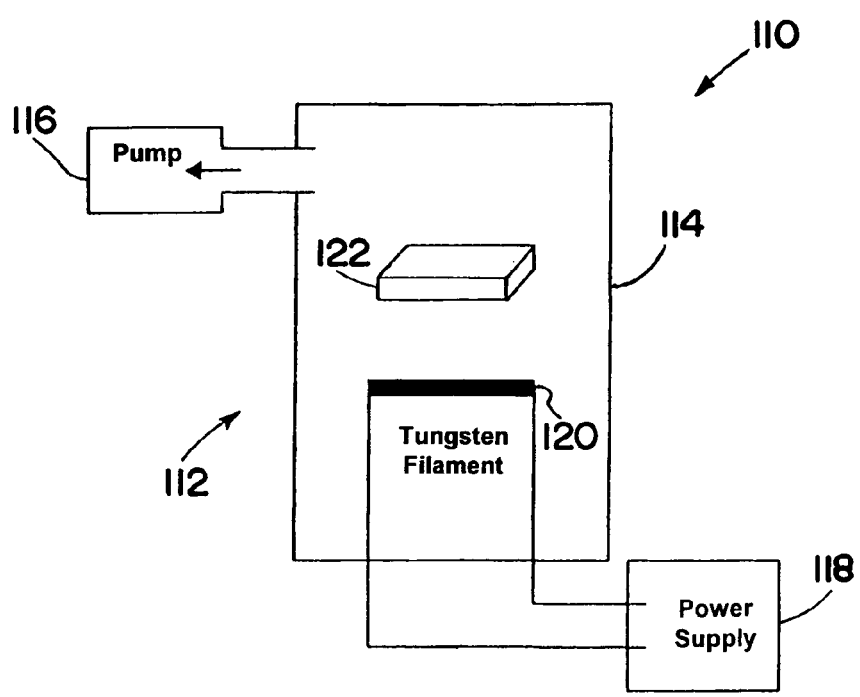
FIG. 7 is a diagram illustrating a process of treating titanium or titanium alloy using a solid solution in a vacuum system to form a titanium or titanium alloy anode.

Referring to FIG. 7, a diagram illustrating an exemplary process 110 of treating titanium or a titanium alloy using a solution in a vacuum system 112 to form a titanium or titanium alloy anode is shown. Vacuum system 112 generally comprises a vacuum chamber 114 and a pump 116 coupled thereto, and used to evacuate vacuum chamber 114. Vacuum system 112 further comprises a power supply 118 and a tungsten filament 120 electrically coupled thereto, and located within vacuum chamber 114. Power supply 118 and tungsten filament 120 are used to heat a sample 122 of titanium or titanium alloy.

Process 110 begins by cleaning sample 122 with acetone in an ultrasonic cleaner for approximately 30 minutes and with mild acid, such a 10% $HNO_3$ solution. Sample 122 is then loaded into vacuum chamber 114 and vacuum chamber 114 is evacuated down to a vacuum between approximately 750 and approximately $10^{-11}$ Torr. Next, sample 122 is heated to a temperature between approximately 700° C. and approximately 1400° C. for approximately 120 minutes using power supply 118 and tungsten filament 120. Thus, process 110 produces a titanium or titanium alloy anode, e.g., sample 122, having a solid solution layer including oxygen, carbon, nitrogen, hydrogen, or a combination thereof.

A titanium or titanium alloy anode also advantageously has a titanium suboxide, a titanium subcarbide, a titanium subnitride or a titanium subhydride layer, or a combination thereof. The chemical compositions of a titanium suboxide, a titanium subcarbide, a titanium subnitride, and a titanium subhydride are $TiO_x$ (where x<2), $TiC_x$ (where x<1), $TiN_x$ (where x<1) and $TiH_x$ (where x<2), respectively. The thickness of each layer or a combination thereof is suitably as much as 10 cm. Such a titanium or titanium alloy anode is produced at any temperature below approximately 1,700° C. and in any environment including oxygen, carbon, nitrogen, hydrogen, or a combination thereof. The pressure of the oxygen, carbon, nitrogen, hydrogen, or a combination thereof is preferably below 760 Torr.

Figure 8:
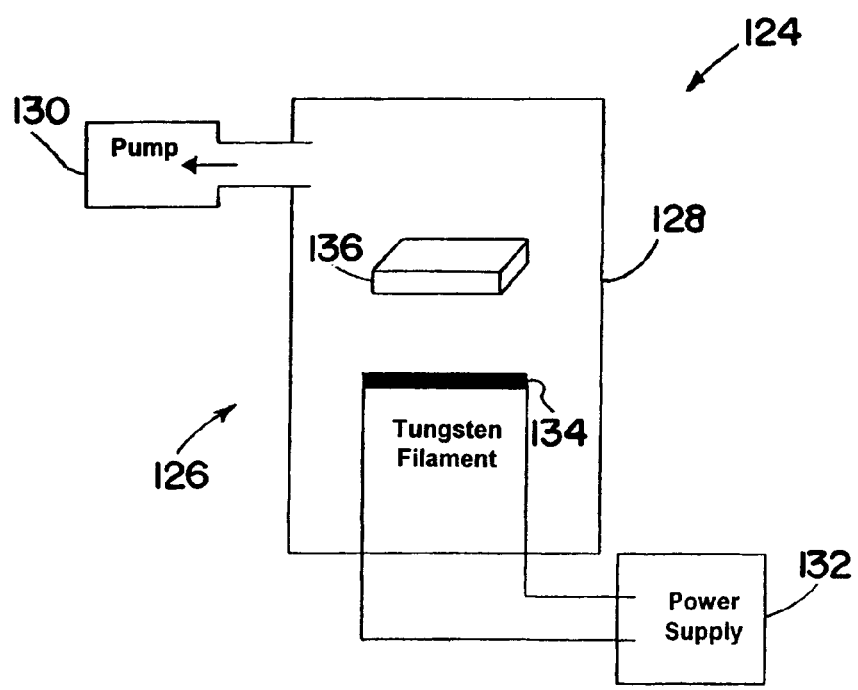
FIG. 8 is a diagram illustrating a process of treating a titanium or titanium alloy using a vacuum system such that the titanium or titanium alloy has a titanium suboxide layer.

Referring now to FIG. 8, an exemplary process 124 of treating a titanium or titanium alloy using a vacuum system 126 such that the titanium or titanium alloy has a titanium suboxide layer. Vacuum system 126 generally comprises a vacuum chamber 128 and a pump 130 coupled thereto, and used to evacuate vacuum chamber 128. Vacuum system 126 further comprises a power supply 132 and a tungsten filament 134 electrically coupled thereto, and located within vacuum chamber 128. Power supply 132 and tungsten filament 134 are used to heat a sample 136 of titanium or titanium alloy.

Process 124 begins by cleaning sample 136 with acetone in an ultrasonic cleaner for approximately 30 minutes and with mild acid, such a 10% $HNO_3$ solution. Sample 136 is then loaded into vacuum chamber 128 and vacuum chamber 128 is evacuated down to a vacuum between approximately 750 and approximately $10^{-8}$ Torr. Next, sample 136 is heated to a temperature between approximately 700° C. and approximately 1400° C. for approximately 60 minutes using power supply 132 and tungsten filament 130. Thus, process 124 produces a titanium or titanium alloy anode, e.g., sample 136, having a titanium suboxide layer.

A titanium or titanium alloy anode also advantageously anodized at any temperature between approximately −273° C. and approximately of 300° C. If the electrochemical reaction of cell including titanium or titanium alloy is exposed to decreasing temperature, the titanium and oxygen ionic transport will be balanced to grow the stoichiometric oxide during anodization. Such an electrochemical reaction is applicable to the anodization of a titanium or titanium alloy anode.

Figure 9:
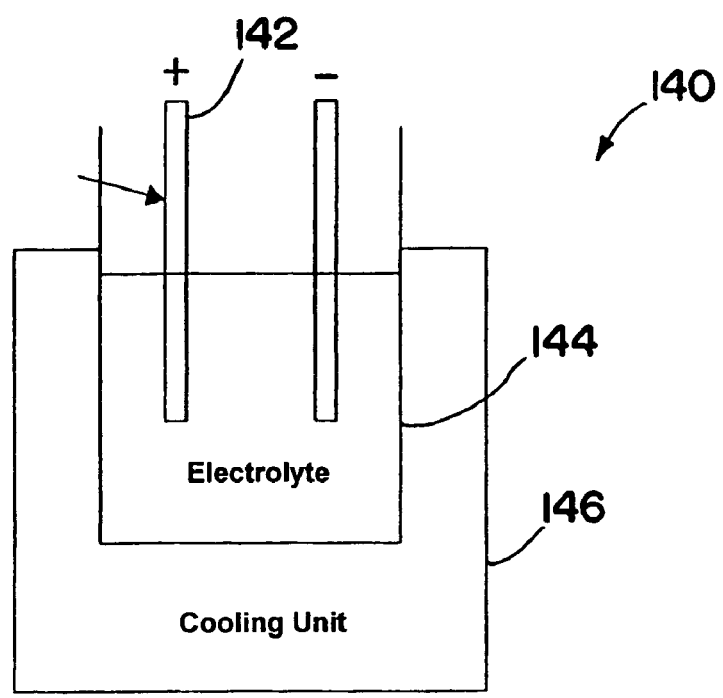
FIG. 9 is a diagram illustrating a process of anodizing a titanium or titanium alloy anode.

Referring to FIG. 9, an exemplary process 140 of anodizing a titanium or titanium alloy anode is shown. Process 140 begins by cleaning a sample 142 of titanium or titanium alloy with acetone in an ultrasonic cleaner for approximately 30 minutes and with mild acid, such as a 10% $HNO_3$ solution. Sample 142 is then placed in an electrolyte, such as a 1% $H_3PO_4$ solution, and sample 142 and electrolyte 144 are placed into a cooling unit 146. Cooling unit 146 advantageously uses dry ice or ice for anodizing. Thus, process 140 anodizes a titanium or titanium alloy anode, e.g., sample 142.

Alternatively, and once cleaned, sample 142 is placed in a liquid nitrogen reservoir for approximately 2 hours. Sample 142 is then taken out of the reservoir and placed immediately into an electrolyte. Such an alternative also anodizes a titanium or titanium alloy anode, e.g., sample 142.

Figure 10:
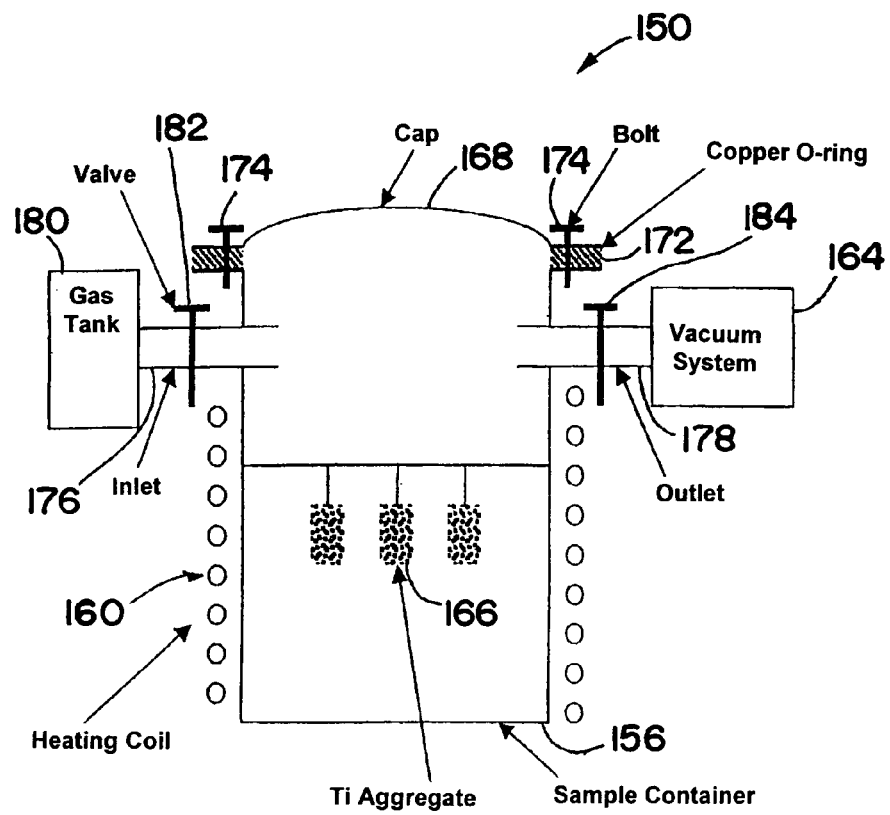
FIG. 10 is a block diagram of a system, a portion of which is shown in cross-section, including a sample container having an inlet and an outlet and a vacuum system.
Figure 11:
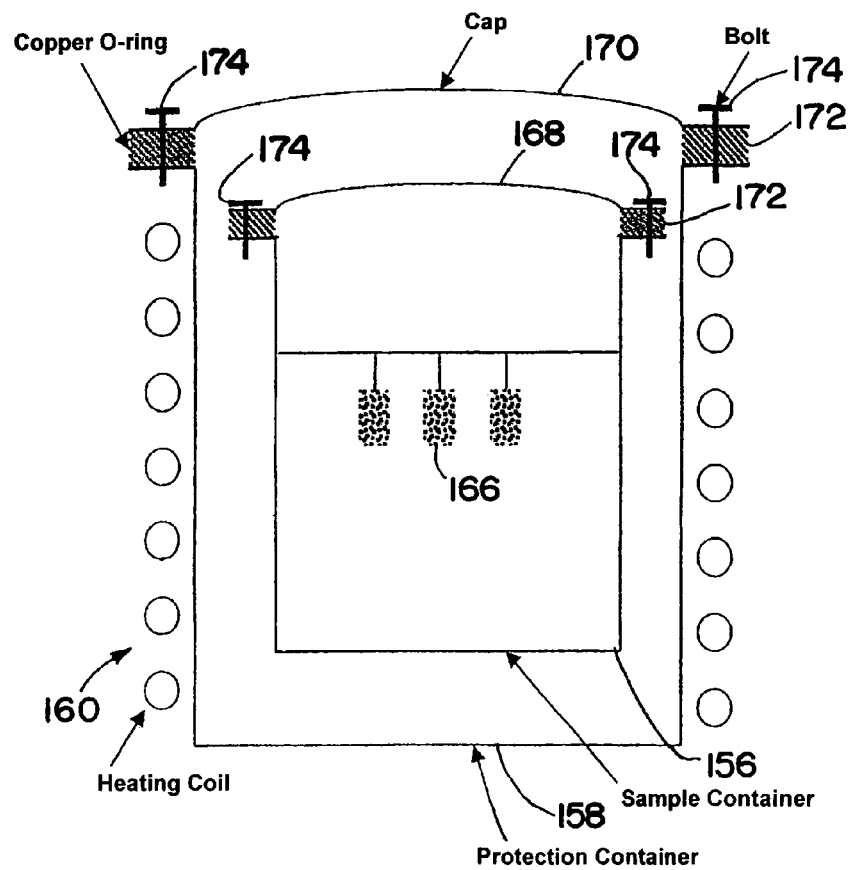
FIG. 11 is a block diagram of a system, a portion of which is also shown in cross-section, including a sample container housing a titanium powder aggregate and protection container.
Figure 12:
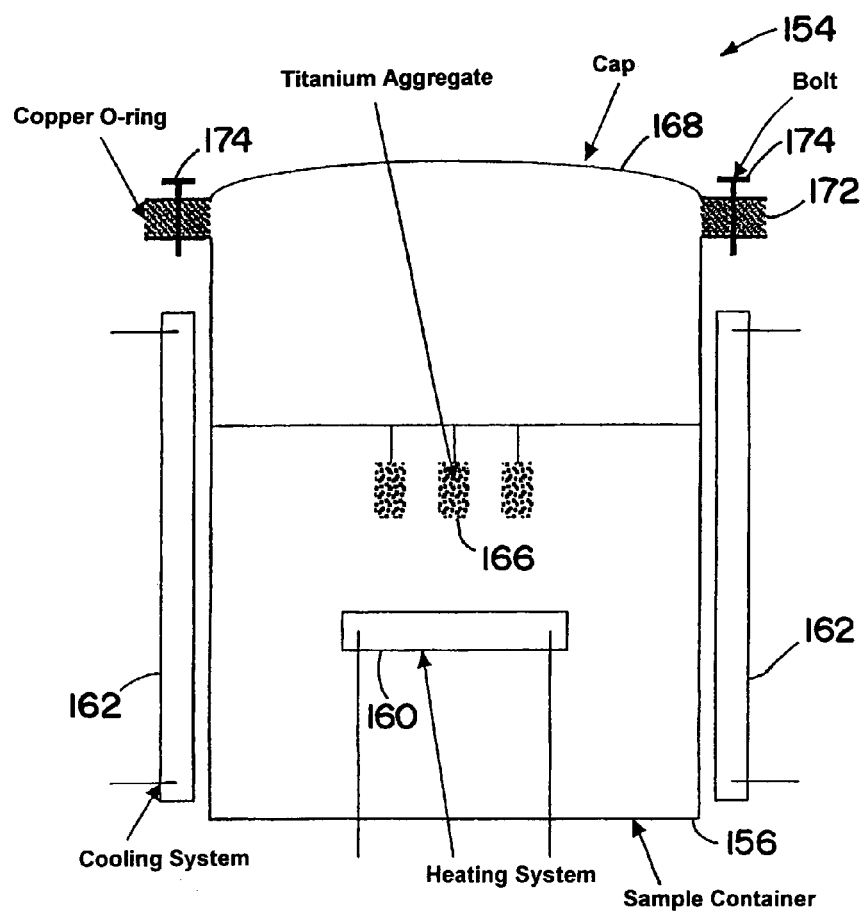
FIG. 12 is a is a block diagram of a system, a portion of which is also shown in cross-section, including a sample container, a cooling system and a heating system.

The processes described in conjunction with FIGS. 6–8 may also be used with systems 150, 152, 154 shown in FIGS. 10–12, respectively, and wherein like numbers denote like parts. Generally systems 150, 152, 154 of FIGS. 10–12 comprise some combination of a sample container 156, a protection container 158, a heating apparatus 160, a cooling apparatus 162, and a vacuum system 164. Sample container 156 is used to house a titanium powder aggregate 166 that, through a process, e.g., a combination of heating, cooling, pressurizing, etc., is formed into anode. Protection container 158 is used to contain sample container 156 in the event that sample container 156 fails during a process, such as, for example, failure due to pressures experienced during a process. Both sample container 156 and protection container 158 include a caps 168 and 170, respectively. Any closing or sealing method for caps 168, 170 may be used, such as, for example welding, gasketing like copper o-rings 172, fastening, e.g., bolts 174 or combination thereof. Protection container 158 thus provides some measure of user protection.

More specifically, system 150 of FIG. 10 comprises a sample container 156 having an inlet 176 and outlet 178. Coupled to inlet 176 is source of gas in the form of a gas tank 180. Coupled to outlet 178 is a vacuum system 164. Valve 182 control the ingress of gas into sample container 156 while valve 184 controls the application of a vacuum to sample container 156. Likewise, system 152 of FIG. 11 comprises a sample container 156 housing a titanium powder aggregate 166. System 152 further comprises protection container 158 that houses sample container 156. Similarly, system 154 of FIG. 12 comprises a heating system 160 for directly, or solely, heating titanium powder aggregate 166 and a cooling system 162 for cooling sample container 156. A heating system 160 is also suitably used to heat sample container 156 containing a titanium powder aggregate 166, as shown in FIGS. 10 and 11.

The dimensions of sample container 156 and protection container 158 are not restricted or limited in size. Sample and protection containers 156, 158 of any size having any wall thickness, volume, diameter, length, height, shape, etc. may be suitably used. Moreover, sample and protection containers 156, 158 are suitable constructed of solid materials including, but not limited to, ceramics, metals, composites, semiconductors, glass, or a combination thereof, and have the ability to prevent the penetration of air and/or gas into or out of the containers. Some suitable examples are stainless steel, cast iron, nickel alloy, and cobalt alloy.

Additional materials, such as those discussed in conjunction with FIG. 6, are inserted into sample container 156 along with titanium powder aggregate 166 in processing. The additional materials are suitably in a liquid, solid or vapor state, examples of which follow: solid or liquid materials containing carbon, hydrogen, nitrogen, oxygen, or combination thereof, gases containing carbon, hydrogen, nitrogen, oxygen, or combination thereof, and periodic elements of group VII (F, Cl, Br, I and At), tantalum oxide, tantalum alloy, niobium oxide, niobium alloy, sodium oxide, sodium chloride, silicon, silicon oxide, silicon alloy, iron, iron alloy, molybdenum, molybdenum alloy, titanium, titanium alloy, titanium carbide, titanium nitride, titanium oxide, titanium hydride, aluminum, aluminum oxide, aluminum alloy, and combinations thereof.

Still referring to FIGS. 10–12, additional processes and process limitations will now be described. For example, sample container 156 is evacuated, such as by vacuum system 164 to a vacuum below 760 Torr, preferably $10^{-6}$ Torr, by closing valve 182 and opening valve 184. Sample and protection containers 156, 158, along with titanium powder aggregate 166, are heated to a temperature above 300° C., preferably approximately 900 to 1000° C., for a preferred period of approximately 7 hours. Alternatively, sample and protection containers 156, 158 and titanium powder aggregate 166 are heated to a temperature above 300° C., preferably approximately 900° C., for a preferred period of 30 seconds, and a vacuum below approximately 760 Torr, preferably approximately $10^{-11}$ Torr is applied. Sample and protection containers 156, 158 and titanium powder aggregate 166 are heated to a temperature above approximately 300° C., preferably approximately 1000° C., for a preferred period of approximately 5 hours.

Alternatively still, a process introduces one of the abovementioned gases into a sample container 156. Such a gas is introduced simultaneously while heating sample and protection containers 156, 158 and titanium powder aggregate 166 to a temperature above approximately 300° C., preferably 1000° C., for preferably approximately 1 minute. A vacuum below approximately 760 Torr, preferably $10^{-11}$ Torr, is applied and heating continues at a temperature above approximately 300° C., preferably 1200° C. It will be appreciated by those of ordinary skill in the art that neither the flow velocity or the amount of the gas is, in any way, restricted or limited.

Alternatively still, a process introduces one of the abovementioned gases into a sample container 156, and pressurizes sample container 156 to a pressure above approximately 760 Torr, preferably approximately 900 Torr. Heating for a preferred period of approximately 10 minutes to a temperature above approximately 300° C., preferably approximately 350° C., is applied. The process reheats at a temperature above approximately 300° C., preferably approximately 600° C., for a preferred period of approximately 30 minutes. Cooling to a temperature below approximately 1800° C., preferably approximately 100° C., is applied along with pressurization below approximately 760 Torr, preferably approximately $10^{-11}$ Torr. A second reheating at a temperature above approximately 300° C., preferably approximately 1200° C., for a preferred period of preferably 3 hours is applied.

Those of ordinary skill in the art will appreciate that many other processes are possible to achieve a desired pretreatment of titanium powder aggregate 166 for use as an anode. Such processes suitably include the method steps of: loading titanium powder aggregate 166 to be processed into sample container 156, sealing sample container 156 using an o-ring 172, cap 168, valves 182, 184, pressurizing sample container 156 to a pressure of approximately 760 Torr, pressurizing sample container 156 to a pressure below approximately 760 Torr for some period of time, pressurizing sample container 156 to a pressure above approximately 760 Torr using one of the aforementioned gases, placing at least one of the abovementioned additive solid and liquid materials in sample container 156, introducing at least one of the aforementioned gases into sample container 156, placing sample container 156 housing titanium powder aggregate 166 into protection container 158 and sealing protection container 158 by at least one of welding, capping, and valving, pressurizing the volume between sample container 156 and protection container 158 to a pressure below approximately 760 Torr, heating sample container 156 and titanium powder aggregate 166 at a temperature above approximately 300° C. for some suitable period of time, heating titanium powder aggregate 166 at a temperature above approximately 300° C. for some suitable period of time, and heating sample container 156 at a temperature above approximately 300° C. for some suitable period of time.

Method steps advantageously further include: heating sample container 156 and titanium powder aggregate 166 in a sequence of temperatures above approximately 300° C. for some period of time, e.g., 500° C.→800° C.→900° C.→1200° C.→1400° C., heating titanium powder aggregate 166 in a sequence of temperatures above 300° C. for some period of time, and heating sample container 156 in a sequence of temperatures above 300° C. for some period of time. Still further, method steps advantageously include: cooling sample container 156 and titanium powder aggregate 166 to a temperature below approximately 1800° C., cooling titanium powder aggregate 166 to a temperature below approximately 800° C., cooling sample container 156 to a temperature below approximately 1800° C., and cooling at least one of sample container 156 and titanium powder aggregate 166, and a combination thereof in a sequence of temperatures below 1800° C. for some period of time, e.g., 900° C.→850° C.→800° C. →600° C.→20° C.→10° C.→40° C.

Thus, processes described herein generally comprise heating, cooling and the application of a vacuum. Those of ordinary skill in the art will appreciate that any suitable combination or sequence of the foregoing method steps can be used. Moreover, any cooling and heating rate can be used. Further, the period of time for heating is anywhere from approximately 1 minute to as much as 5,000 hours, depending on the temperature, the volume and surface area of titanium powder aggregate 166, the system 150, 152, 154 used, etc. Likewise, the temperature and time can change from one process to another.

Earlier capacitors using titanium or titanium alloy and incorporating anode films are typically characterized by a high density of inherent defects, such as microvoids, microcrystallites, oxygen vacancy, suboxides, and variation of nonstoichiometry. These inherit defects are manifested in unstable dielectrics and unacceptable electric performance including excessive leakage currents and large variations in capacitance values. In contrast, the aforementioned processes produce a near ideal capacitor-quality anode film. This homogeneous and defect-free anode film when used in a capacitor allows the capacitor to exhibit excellent electrical characteristics including, high capacitance, long-term stability, high energy density and/or high power density.

A thickness of an anode film is determined theoretically by the current density used to anodize and the time required to reach the rated voltage in accordance with Faraday's law:

$$d=(\int Idt)M/nAF\rho$$

where d is the thickness, I is the current, t is the time, M is molecular weight of the anode oxide, n is the number of electron exchanged to form one oxide molecule, A is anodized surface area, F is 96,490C/mol, and $\rho$ is the density of the oxide. In earlier capacitors using titanium or titanium alloy and incorporating anode films, M, n and $\rho$ varied and were unpredictable because of the defective structure having a different stoichiometry of the oxide; and thus, the thickness of the oxide was not consistent and uniform. In contrast, the subject processes produce an anode film with a generally consistent, reproducible and uniform thickness due to M, n and $\rho$ being relatively constant. Moreover, the thickness per voltage will be approximately 1–10 nm, depending on the particular process used. Further, the forgoing processes generally provide relatively low leakage currents and a well-controlled capacitance values.

Ideal dielectric materials exhibit a linear relationship between capacitance and voltage having a negative slope, that is described by the equation:

$$CV=constant,$$

where C is capacitance and V is the anodizing voltage. Earlier capacitors using titanium typically failed to preserve this relationship. In contrast, the aforementioned processes generally preserve this relationship. Furthermore, the capacitance of capacitors made using the aforementioned processes at de-rated voltages generally measure the same at that of the anodizing voltage. This factor is often used to judge a dielectric film for use in capacitors. Thus, capacitors using dielectric films produced using the aforementioned processes typically exhibit a higher capacitance voltage per gram (CV/g), e.g., up to 10 times more than that of tantalum and niobium capacitors.

Leakage current is another parameter used to judge capacitors and is of critical concern as failure mechanism during operation. Earlier capacitors using titanium or titanium alloy and incorporating anode films typically exhibited leakage current densities in the range of 11–4,000 $\mu A/cm^2$ based on anodizing voltages of 10–200 volts. Moreover, the leakage current density at de-rated voltages was still high, so failures readily occurred. In contrast, capacitors made using the aforementioned processes typically exhibit leakage current densities ranging approximately from 1–100 $\mu A/cm^2$ based on based on anodizing voltages of 10–200 volts and the leakage current density at de-rated voltages is typically below 1 $nA/cm^2$.

The long-term stability for capacitors using titanium or titanium alloy and incorporating anode films is practically the fault current. The fault current could pass through the bulk of the dielectric, through defects in the dielectric, or in route by passing the dielectric and bridging between the anode and the cathode. Although leakage current paths may not be the paths taken by a fault current, the ratio of the leakage current at working voltage to the leakage current at an anodizing voltage should be lower than a value y in the following equation:

$$y=0.982x+0.018,$$

where y represents the dropping ratio of two leakage currents, and x is a de-rated voltage ratio. In prior art capacitors using titanium or titanium alloy and incorporating anode films, the leakage current ratio typically exceed the value y, disqualifying an anode film from use in such a capacitor. In contrast, the leakage current ratio typically exhibit by films using the aforementioned process is generally much less than the value y due to ideal nature and stability exhibited by the film.

Another advantage of the foregoing processes is to prevent or decrease the incorporation of anion impurities such as, for example, $PO_4^{3-}$ and $SO_4^{2-}$, and water from the electrolyte solution into a film at the film/solution interface. Incorporated anions markedly reduce the dielectric constant of a film and increase the electric field required for a given ionic current density. Similarly, a high content of hydrating water or an $OH^-$ bridge in the film also results in a relatively high dielectric constant and low donor density. Thus, the foregoing processes have an advantage by providing an ability to control anion impurities and water to achieve a desired specification.

Further, the foregoing processes produce an anode film having an energy density on the order of 60 J/g, which is generally 10 times higher than that of an anode film of tantalum pentoxide (6 J/g). In addition, an anode film produced by the foregoing processes does not generally need a self-healing layer of $MnO_2$ or polymer commonly used in package capacitors, such as multilayer ceramic capacitors (MLCC).

In an ideal dielectric film, the capacitance is inversely proportional to the thickness of the dielectric film at the formation voltage and at de-rated voltages. Again, the aforementioned processes produce a near ideal capacitor-quality anode film. Such a film is suitably of titanium oxide. Table 1 shows the capacitance of a film of titanium oxide produce using the aforementioned processes at different anodizing and de-rated voltages, and in comparison to anodized tantalum oxide.

TABLE 1

Capacitance of anodized titanium oxide at different anodizing and de-rated voltages including the capacitance of anodized tantalum oxide for comparison.

| Anodizing voltage (V) | Derated voltage (V) | Capacitance of anodized titanium oxide ($\mu F/cm^2$) | | Capacitance of anodized tantalum oxide ($\mu F/cm^2$) |
|---|---|---|---|---|
| 10 | 5 | 1.19 | 1.18 | 1.21 |
|  | 6 | 1.18 | 1.17 | N/A |
|  | 7 | 1.18 | 1.19 | N/A |
|  | 8 | 1.18 | 1.18 | N/A |
|  | 9 | 1.17 | 1.18 | 1.19 |
| 20 | 5 | 0.62 | 0.60 | 0.62 |
|  | 6 | 0.60 | 0.61 | N/A |
|  | 7 | 0.61 | 0.59 | N/A |
|  | 8 | 0.59 | 0.59 | 0.61 |
|  | 9 | 0.62 | 0.58 | 0.60 |
| 30 | 5 | 0.38 | 0.38 | N/A |
|  | 6 | 0.39 | 0.38 | N/A |
|  | 7 | 0.37 | 0.39 | 0.40 |
|  | 8 | 0.40 | 0.38 | 0.41 |
|  | 9 | 0.39 | 0.40 | 0.41 |

Each value in Table 1 represents an individual sample, yet each sample uses the same process or pretreatment. The samples demonstrate reproducibility, reliability, and consistency of the results shown. Again, the capacitances of anodized tantalum oxide are included in Table 1 for purposes of comparison. It will be appreciated that, as shown in Table 2, the capacitance and energy density of anodized titanium oxide is dependent on the pretreatment process.

Table 2 shows capacitance values of 0.6 and 2.9 $\mu F/cm^2$ for the anodized titanium oxide at an anodizing voltage of 20 Volts in a dilute aqueous phosphoric acid, and in comparison with a capacitance value of 0.6 $\mu F/cm^2$ for anodized tantalum oxide at the same anodizing voltage and in the same electrolyte.

TABLE 2

Dependence of the capacitance and energy density of titanium oxide on the pretreatment process including the capacitance and energy density of anodized tantalum oxide for comparison.

| Anodizing voltage (V) | Capacitance of anodized titanium oxide ($\mu F/cm^2$) | Energy density of anodized titanium oxide at 5 V ($J/cm^2$) | Capacitance of anodized tantalum oxide ($\mu F/cm^2$) | Energy density of anodized tantalum oxide at 5 V ($J/cm^2$) |
|---|---|---|---|---|
| 20 | 0.6 | 7.50 | 0.6 | 7.50 |
| 20 | 2.9 | 36.25 | | |

Based on the anodizing voltage and the demonstrated capacitance, the energy density of the anodized titanium oxide is calculated to be 7.50 and 36.25 $J/cm^2$ at the rated 5 Volts, and as shown in Table 2. It will be appreciated that the energy density of anodized tantalum oxide at the same rated voltage is 7.50 $J/cm^2$. Thus, in comparison, the capacitance and energy density of the anodized titanium oxide is same or as much as 4.83 times greater than that of anodized tantalum oxide, depending on the process.

Table 3 shows the leakage current of the anodized titanium oxide, and was obtained at values of 0.25 and 0.80 nA/$\mu$FV at a de-rated voltage of 5 Volts (formation voltage of 20 V) after 3 minutes in a dilute aqueous phosphoric acid.

TABLE 3

Leakage current of the anodized titanium oxide including the leakage current of anodized tantalum oxide for comparison.

| Anodizing voltage (V) | Derated voltage (V) | Leakage current of anodized titanium oxide | | Leakage current of anodized tantalum oxide | |
|---|---|---|---|---|---|
|  |  | In unit of nA/$\mu$FV | In unit of nA/$cm^2$ | In unit of nA/$\mu$FV | In unit of nA/$cm^2$ |
| 20 | 5 | 0.25 | 3.6 | 1.67 | 5.0 |
| 20 | 5 | 0.80 | 2.4 | | |

As tabulated, both of these leakage currents are below a practical value of 10 nA/$\mu$FV and, therefore, are suitable as a dielectric film for a capacitor. As also tabulated, anodized tantalum oxide exhibits a value of 1.67 nA/$\mu$FV for at the same rated voltage, formation voltage, time and electrolyte. In terms of measures per unit area, 0.25, 0.80 and 1.67 nA/$\mu$FV correspond to 3.6, 2.4 and 5.0 nA/$cm^2$, respectively. The tabulated data demonstrates that anodized titanium oxide has better insulating properties than anodized tantalum oxide. Further, it was found that even after a constant 5 V was applied to the anodized titanium oxide in a dilute aqueous phosphoric acid for 18 hours, the low leakage current of 2.4 nA/$cm^2$ was maintained. Thus, the film does not demonstrated a typical leakage behavior commonly associated with anodized titanium oxide; that is, the leakage current decreases at the beginning, then increasing between approximately two and twenty minutes, and never decrease down to 10 nA/$\mu$FV or less.

By virtue of the foregoing, inconsistent capacitance and the high and variable leakage current behaviors associated with the use of titanium and titanium alloys for anodes are resolved. Moreover, leakage current and capacitance in the processing or manufacture of capacitors using titanium and titanium alloy anodes is controlled. Further, fabrication techniques for anodes using titanium or a titanium alloy are provided.

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for constructing a capacitor electrode, the method comprising:
    providing an anode from one or more of titanium and a titanium alloy;
    at the same time as or after the providing, treating at least one surface of the anode; and
    subsequent to the treating, forming a capacitor-quality anodic film on the at least one surface of the anode;
    wherein the treating includes deforming the at least one surface of the anode, thereby enhancing migration of titanium ions at the interface between the at least one surface and the anodic film.

2. A method for constructing a capacitor electrode, the method comprising:
provide an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes quenching the anode such that the anode has an amorphous structure that supplies a higher density of active sites at which to nucleate titanium oxide relative to a crystalline structure.

3. The method of claim 2, further comprising, prior to the quenching, heating the anode in a vacuum to a temperature between 1200 degrees Celsius (° C.) and 2000° C.

4. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes depositing on the at least one surface at least one of calcium, calcium oxide, manganese, manganese oxide, magnesium, or magnesium oxide.

5. The method of claim 4, further comprising heating the anode and the at least one of calcium, calcium oxide, manganese, manganese oxide, magnesium, or magnesium oxide, to a temperature between 500 degrees Celsius (° C.) and 1000° C.

6. The method of claim 4, wherein the depositing is conducted in a vacuum.

7. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes etching the anode such that the anode has a surface roughness that increases one or more of surface area and surface energy.

8. The method of claim 7, wherein the etching occurs at a pressure of approximately $10^{-6}$ Torr.

9. The method of claim 7, wherein the surface roughness has a height from 1 nanometer (nm) to 0.1 millimeter (mm), and a width from 1 nm to 0.1 mm.

10. The method of claim 7, wherein the etching is wet etching.

11. The method of claim 7, wherein the etching is dry etching.

12. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the providing the anode includes creating the anode using sputtering, electrochemical reaction, ion-implantation, chemical reaction, heat treatment, sintering, oxidation, reduction, carburization, decarburization, nitriding, denitriding, hydrogenization, dehydrogenization, chemical vapor deposition, physical vapor deposition, evaporation, or a combination thereof.

13. The method of claim 12, wherein the creating the anode includes sputtering performed using an argon gas.

14. The method of claim 12, wherein the creating the anode includes sputtering performed using a sputtering gas.

15. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes treating the anode with at least one of hydrogen (H), the alkali group of metals (Li, Na, K, Rb, Cs, and Fr), the halogen group of elements (F, Cl, Br, I, and At), the IVb group of metals (Ti, Zr, Hf, and Rf), carbon, nitrogen, oxygen, iron, sulfur, aluminum, silicon, copper, titanium, niobium, tantalum, yttrium, or a combination thereof, In a solution, a compound, or an alloy.

16. The method of claim 15,
further comprising heating the anode and the at least one of hydrogen (H), the alkali group of metals (Li, Na, K, Rb, Cs, and Fr), the halogen group of elements (F, Cl, Br, I, and At), the IVb group of metals (Ti, Zr, Hf, and Rf), carbon, nitrogen, oxygen, iron, sulfur, aluminum, silicon, copper, titanium, niobium, tantalum, yttrium, or a combination thereof, to a temperature between 500 degrees Celsius (° C.) and 1700° C.; and
wherein the heating takes place in a vacuum.

17. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes treating the anode to create on the at least one surface a solid solution layer including at least one of oxygen, carbon, nitrogen, or hydrogen.

18. The method of claim 17,
wherein the treating to create the solid solution layer includes heating the anode to a temperature between 700 degrees Celsius (° C.) and 1400° C.; and
wherein the heating occurs in a vacuum.

19. The method of claim 17, wherein the layer is less than 10 centimeters (cm).

20. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes treating the anode to create on the at least one surface a layer containing at least one of a titanium suboxide, a titanium subcarbide, a titanium subnitride, or a titanium subhydride.

21. The method of claim 20, wherein the layer is less than 10 centimeters (cm).

22. The method of claim 20,
wherein the treating to create the layer includes heating the anode to a temperature between 700 degrees Celsius (° C.) and 1400° C.; and
wherein the heating occurs in a vacuum.

23. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the forming the anodic film includes anodizing the anode; and
wherein the anodizing includes placing the anode in at least one of an aqueous electrolyte of an acid, aqueous electrolyte of a base, or a molten salt electrolyte.

24. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes altering the surface structure of the at least one surface.

25. The method of claim 24, wherein the altering the surface structure includes changing a crystalline structure at the at least one surface to one or more of an amorphous structure, a random structure, and a distorted structure.

26. The method of claim 24, wherein the altering the surface structure includes changing a crystalline structure at the at least one surface to an amorphous structure.

27. The method of claim 24, wherein the altering the surface structure includes enhancing kinetics of titanium anodization at the at least one surface.

28. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes changing material structure at the at least one surface.

29. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes enhancing titanium ion migration at the at least one surface.

30. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes increasing surface area of the at least one surface.

31. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes roughening the at least one surface.

32. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes increasing active sites on the at least one surface.

33. A method for constructing a capacitor electrode, the method comprising:
providing an anode from one or more of titanium and a titanium alloy;
at the same time as or after the providing, treating at least one surface of the anode; and
subsequent to the treating, forming a capacitor-quality anodic film on the at least one surface of the anode;
wherein the treating includes, reduction, carburization, de-carburization, nitriding, de-nitriding, hydrogenation, or de-hydrogenation, or a combination thereof.

* * * * *